US008176524B2

(12) United States Patent
Singh et al.

(10) Patent No.: US 8,176,524 B2
(45) Date of Patent: May 8, 2012

(54) SYSTEM AND METHOD FOR WIRELESS COMMUNICATION OF VIDEO DATA HAVING PARTIAL DATA COMPRESSION

(75) Inventors: Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 502 days.

(21) Appl. No.: 12/107,685

(22) Filed: Apr. 22, 2008

(65) Prior Publication Data
US 2009/0265744 A1 Oct. 22, 2009

(51) Int. Cl.
*H04N 7/173* (2006.01)
(52) U.S. Cl. .......... 725/116; 725/93; 725/146; 370/352; 709/219
(58) Field of Classification Search .......... 725/87–120; 209/217–231; 370/328–352
See application file for complete search history.

(56) References Cited

U.S. PATENT DOCUMENTS

| | | | |
|---|---|---|---|
| 5,233,348 A | 8/1993 | Pollmann et al. | |
| 5,680,129 A | 10/1997 | Weinberger et al. | |
| 5,978,545 A | 11/1999 | Kato et al. | |
| 6,108,382 A * | 8/2000 | Gringeri et al. | 375/240.01 |
| 6,201,834 B1 | 3/2001 | Zhu | |
| 6,519,005 B2 | 2/2003 | Bakhmutsky et al. | |
| 6,532,268 B1 | 3/2003 | Morisawa | |
| 6,597,402 B1 | 7/2003 | Butler et al. | |
| 6,618,397 B1 | 9/2003 | Huang | |
| 6,747,993 B2 | 6/2004 | Rinchiuso | |
| 6,756,921 B2 | 6/2004 | Kimura et al. | |
| 6,868,186 B1 * | 3/2005 | Sadeh | 382/238 |

(Continued)

FOREIGN PATENT DOCUMENTS
JP 2003/152733 A 5/2003
(Continued)

OTHER PUBLICATIONS

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

(Continued)

*Primary Examiner* — Annan Shang
(74) *Attorney, Agent, or Firm* — Kenneth L. Sherman, Esq.; Michael Zarrabian, Esq.; Sherman & Zarrabian LLP

(57) ABSTRACT

A system and method for wireless communication of video data are disclosed. One embodiment of the system transmits partially compressed video data from a transmitter to a receiver over a wireless channel. The transmitter is configured to send a plurality of groups of data bits over a wireless channel. The data bits, in an uncompressed form, together form one or more displayable elements representing at least a portion of a video image. The plurality of groups have different degrees of significance to the quality of the video image. The plurality of groups include a first group of uncompressed data bits, and a second group of compressed data bits, wherein the first group has a higher degree of significance to the quality of the video image than the second group. The receiver is configured to receive the plurality of groups of data bits over the wireless channel. The system allows transmission of a large amount of video data over a wireless channel having a limited capacity or a varying condition.

37 Claims, 11 Drawing Sheets

U.S. PATENT DOCUMENTS

| | | | |
|---|---|---|---|
| 6,879,266 B1 | 4/2005 | Dye et al. | |
| 6,915,016 B2* | 7/2005 | Varshney et al. | 382/240 |
| 6,966,065 B1* | 11/2005 | Kitazato et al. | 725/116 |
| 7,146,185 B2 | 12/2006 | Lane | |
| 7,184,588 B2* | 2/2007 | Proteau et al. | 382/162 |
| 7,313,810 B1* | 12/2007 | Bell et al. | 725/116 |
| 7,340,764 B2* | 3/2008 | Kubota et al. | 725/90 |
| 7,385,921 B2 | 6/2008 | Itakura et al. | |
| 7,492,789 B2 | 2/2009 | Shvodian | |
| 7,512,180 B2* | 3/2009 | Florencio | 375/240.12 |
| 7,664,185 B2 | 2/2010 | Zhang et al. | |
| 7,752,647 B2* | 7/2010 | Fung | 725/93 |
| 7,817,577 B2 | 10/2010 | Kim et al. | |
| 7,826,436 B2 | 11/2010 | Niu et al. | |
| 2002/0042917 A1 | 4/2002 | Townsend et al. | |
| 2002/0071485 A1 | 6/2002 | Caglar et al. | |
| 2002/0118763 A1 | 8/2002 | Harris et al. | |
| 2002/0184384 A1 | 12/2002 | Simmon et al. | |
| 2002/0191700 A1* | 12/2002 | Varshney et al. | 375/240.19 |
| 2003/0174243 A1 | 9/2003 | Arbeiter et al. | |
| 2004/0156354 A1 | 8/2004 | Wang et al. | |
| 2005/0123042 A1 | 6/2005 | Park | |
| 2005/0208961 A1 | 9/2005 | Willenegger | |
| 2007/0014356 A1* | 1/2007 | Han et al. | 375/240.12 |
| 2007/0047485 A1 | 3/2007 | Gorokhov et al. | |
| 2007/0097257 A1 | 5/2007 | El-Maleh et al. | |
| 2007/0110396 A1 | 5/2007 | Itoh et al. | |
| 2007/0189383 A1 | 8/2007 | Shao et al. | |
| 2007/0189397 A1 | 8/2007 | Ngo et al. | |
| 2007/0195893 A1 | 8/2007 | Kim et al. | |
| 2007/0202842 A1 | 8/2007 | Shao et al. | |
| 2007/0202843 A1* | 8/2007 | Niu et al. | 455/403 |
| 2007/0206875 A1 | 9/2007 | Ida et al. | |
| 2007/0223823 A1 | 9/2007 | Islam et al. | |
| 2007/0230461 A1 | 10/2007 | Singh et al. | |
| 2007/0234134 A1 | 10/2007 | Shao et al. | |
| 2007/0263937 A1* | 11/2007 | Rizko | 382/232 |
| 2007/0268972 A1* | 11/2007 | Kim | 375/240.27 |
| 2008/0037624 A1 | 2/2008 | Walker et al. | |
| 2008/0043832 A1* | 2/2008 | Barkley et al. | 375/240 |
| 2008/0063069 A1 | 3/2008 | Sekiguchi et al. | |
| 2008/0123739 A1* | 5/2008 | Reznic et al. | 375/240.08 |
| 2008/0144553 A1 | 6/2008 | Shao et al. | |
| 2008/0204461 A1 | 8/2008 | Hutchins | |
| 2009/0021646 A1 | 1/2009 | Shao et al. | |
| 2009/0063935 A1 | 3/2009 | Singh et al. | |
| 2009/0086699 A1 | 4/2009 | Niu et al. | |
| 2009/0241147 A1* | 9/2009 | Kim et al. | 725/62 |

FOREIGN PATENT DOCUMENTS

| | | |
|---|---|---|
| WO | WO 2004/034654 | 4/2004 |
| WO | WO 2004/073201 A1 | 8/2004 |

OTHER PUBLICATIONS

EIA/CEA-861-B, A DTV Profile for Uncompressed High Speed Digital Interfaces, EIA Engineering Standarts and Publications, Electronic Industries Alliance Technology Strategy & Standards Department, Arlington, VA., May 2002, pp. 1-134.

Gharai et al., RTP Payload Format for Uncompressed Video, Network Working Group, Request for Comments: 4175; The Internet Society, Sep. 2005, pp. 1-17.

Hitachi et al., High-Definition Multimedia Interface (HDMI) Specifications version 1.2, Aug. 22, 2005, pp. 1-214.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003, pp. 1-362.

Lettieri et al. "Adaptive frame length control for improving wireless link throughput, range, and energy efficiency", *INFOCOM* Seventeenth Annual Joint Conference of the *IEEE* Computer and Communication Societies, vol. 2 (Mar.-Apr. 1998), 8 pages.

Maruhashi et al., Wireless uncompressed-HDTV-signal; transmission system utilizing compact 60-GHz-band transmitter and receiver, Microwave Symposium Digest, 2005 IEEE MTTS International, Jun. 12-17, 2005, pp. 1867-1870.

MBOA, Distributed Medium Access Control (MAC) for wireless networks, WiMedia Alliance, Draft 0.99, Nov. 1, 2005, pp. 1-182.

Modiano, Eytan, "An adaptive algorithm for optimizing the packet size used in wireless ARQ protocols", *Wireless Networks*, vol. 5, No. 4 pp. 279-286 (Jul. 1999).

Wang et al., Error Control and Concealment for Video Communication: A Review, Proceedings of the IEEE, 86(5): 974-997 (May 1998).

International Preliminary Report on Patentability & Written Opinion dated Aug. 19, 2008 for PCT/KR2007/000802, filed Feb. 15, 2007.

International Preliminary Report on Patentability & Written Opinion dated Aug. 19, 2008 for PCT/KR2007/000827, filed Feb. 15, 2007.

International Preliminary Report on Patentability & Written Opinion dated Jun. 16, 2009 for PCT/KR2007/006148, filed Nov. 30, 2007.

International Preliminary Report on Patentability & Written Opinion dated May 19, 2009 for PCT/KR2007/003251, filed Jul. 4, 2007.

International Preliminary Report on Patentability & Written Opinion dated Sep. 30, 2008 for PCT/KR2007/001527, filed Mar. 29, 2007.

International Search Report dated Feb. 15, 2007 for PCT/KR2007/000827, filed Feb. 15, 2007.

International Search Report dated Jul. 9, 2007 for PCT/KR2007/001527, filed Mar. 29, 2007.

International Search Report dated Mar. 10, 2008 for PCT/KR2007/006148.

International Search Report dated May 22, 2007 for PCT/KR2007/000802, filed Feb. 15, 2007.

International Search Report dated Oct. 12, 2007 for PCT/KR2007/003251, filed Jul. 4, 2007.

Hachman, "CE Giants back Amimon's Wireless HDTV Tech," *PCMAG.com*, 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

High-Definition Multimedia Interface (HDMI) Specification Version 1.3 (Jun. 22, 2006).

Information technology—JPEG 2000 image coding system—Part 11: Wireless. ISO/IEC JTC 1/SC 29 (Mar. 21, 2005).

U.S. Non-Final Office Action for U.S. Appl. No. 11/833,919 mailed May 26, 2010

U.S. Final Office Action for U.S. Appl. No. 11/833,919 mailed Sep. 30, 2010.

U.S. Non-Final Office Action for U.S. Appl. No. 11/833,919 mailed May 4, 2011.

U.S. Non-Final Office Action for U.S. Appl. No. 11/635,969 mailed Oct. 25, 2011.

U.S. Final Office Action for U.S. Appl. No. 11/833,919 mailed Oct. 17, 2011.

U.S. Notice of Allowance for U.S. Appl. No. 11/833,919 mailed Jan. 10, 2012.

* cited by examiner

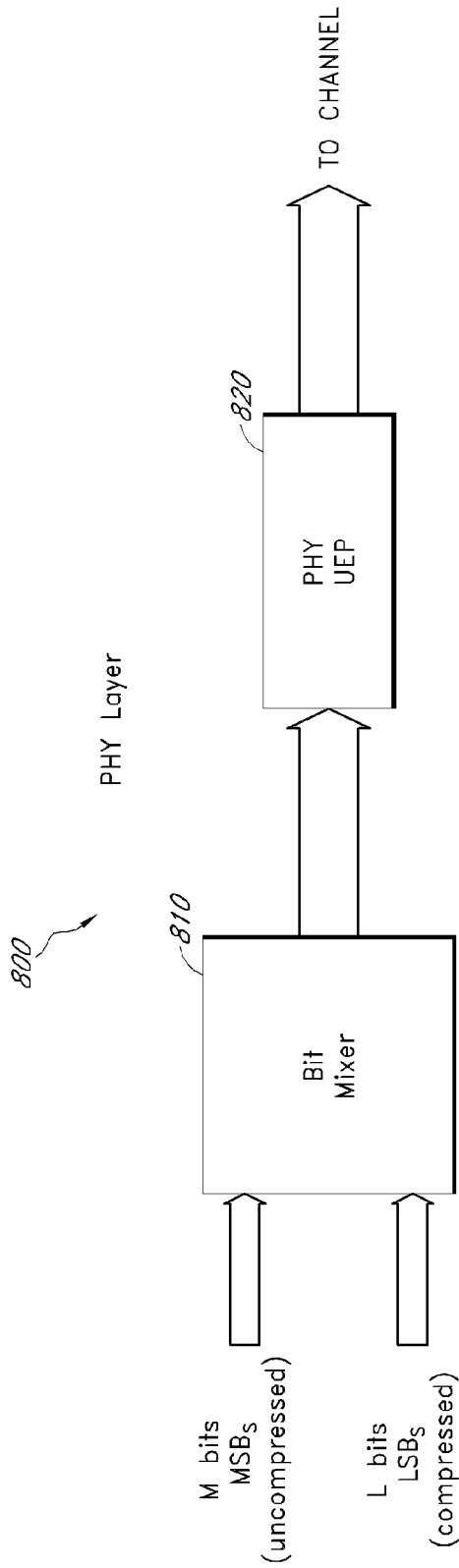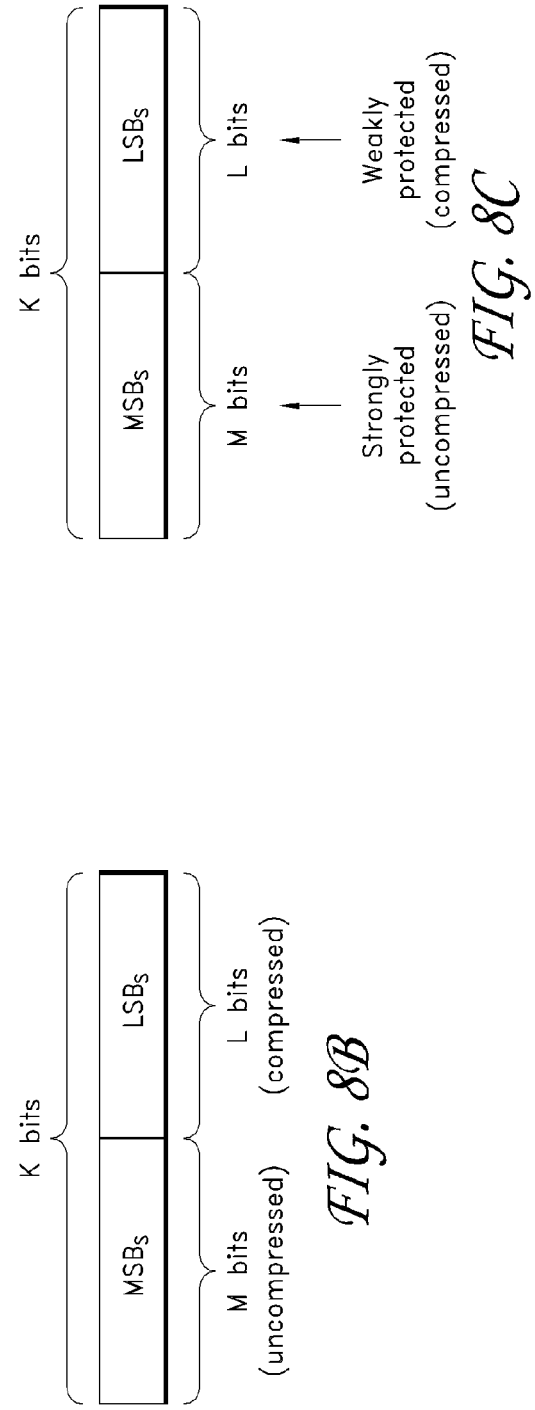
FIG. 8A
FIG. 8B
FIG. 8C

SYSTEM AND METHOD FOR WIRELESS COMMUNICATION OF VIDEO DATA HAVING PARTIAL DATA COMPRESSION

BACKGROUND OF THE INVENTION

1. Field of the Invention

The present invention relates to wireless transmission of video data, and particularly to transmission of high definition video data over wireless channels.

2. Description of the Related Technology

With the proliferation of high quality video, an increasing number of electronic devices, such as consumer electronic devices, utilize high definition (HD) video which can require multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices which do not have the bandwidth to carry the uncompressed HD signals are connected.

Transmission of uncompressed video has several advantages over compressed video. Transmission of uncompressed video does not have latency involved in compressing and decompressing video. In addition, transmission of uncompressed video provides greater resilience to channel errors because uncompressed video has higher spatial redundancy. However, transmission of uncompressed video over a wireless channel is challenging because uncompressed video requires transmission of a larger amount of data than compressed video.

SUMMARY OF CERTAIN INVENTIVE ASPECTS

In one embodiment, there is a method of wireless communication for video data. The method comprises dividing a displayable element including a plurality of data bits into a plurality of groups of data bits. The displayable element represents a portion of a video image, wherein the plurality of data bits are divided into the plurality of groups based at least partly on significance to the quality of the video image. The method also comprises compressing at least one, but not all, of the groups of data bits based at least partly on the significance to the quality of the video image after dividing the displayable element; and transmitting the plurality of groups of data bits over a wireless channel after compressing the at least one group.

In another embodiment, there is a method of wireless communication for video data. The method comprises: receiving information on a condition of a wireless channel; and selectively compressing a plurality of data bits of a displayable element, based at least partly on the condition of the wireless channel. The displayable element represents a portion of a video image, wherein the plurality of data bits are selectively compressed based at least partly on significance to the quality of the video image. The method further comprises transmitting the selectively compressed data bits over the wireless channel.

In yet another embodiment, there is a system for wireless communication of video data. The system comprises: a transmitter configured to send a plurality of groups of data bits over a wireless channel. The data bits, in an uncompressed form, together form one or more displayable elements representing at least a portion of a video image. The plurality of groups have different degrees of significance to the quality of the video image. The plurality of groups comprise a first group of uncompressed data bits, and a second group of compressed data bits. The first group has a higher degree of significance to the quality of the video image than the second group. The system further comprises a receiver configured to receive the plurality of groups of data bits over the wireless channel.

In yet another embodiment, there is a wireless communication device for transmitting video data. The device comprises: a transmitter comprising: a first block configured to divide a displayable element including a plurality of data bits into a plurality of groups of data bits. The displayable element represents a portion of a video image. The plurality of data bits are divided into the plurality of groups based at least partly on significance to the quality of the video image. The transmitter also comprises a second block configured to compress at least one, but not all, of the groups of data bits based at least partly on the significance to the quality of the video image.

In yet another embodiment, there is wireless communication device for receiving video data. The device comprises: a receiver configured to receive and process a plurality of groups of data bits over a wireless channel. The data bits, in an uncompressed form, together form one or more displayable elements representing at least a portion of a video image. The plurality of groups have different degrees of significance to the quality of the video image. The plurality of groups comprise a first group of uncompressed data bits, and a second group of compressed data bits. The first group has a higher degree of significance to the quality of the video image than the second group.

BRIEF DESCRIPTION OF THE DRAWINGS

FIG. 8A is a block diagram of the PHY layer of an example transmitter, employing partial data compression for transmission of HD video over a wireless medium, according to another embodiment of the system and method.

FIG. 8B is one embodiment of a displayable element output from the bit mixer of FIG. 8A for transmission of HD video over a wireless medium.

FIG. 8C is one embodiment of a displayable element output from the PHY UEP block of FIG. 8A for transmission of HD video over a wireless medium.

DETAILED DESCRIPTION OF CERTAIN EMBODIMENTS

Figure 1:
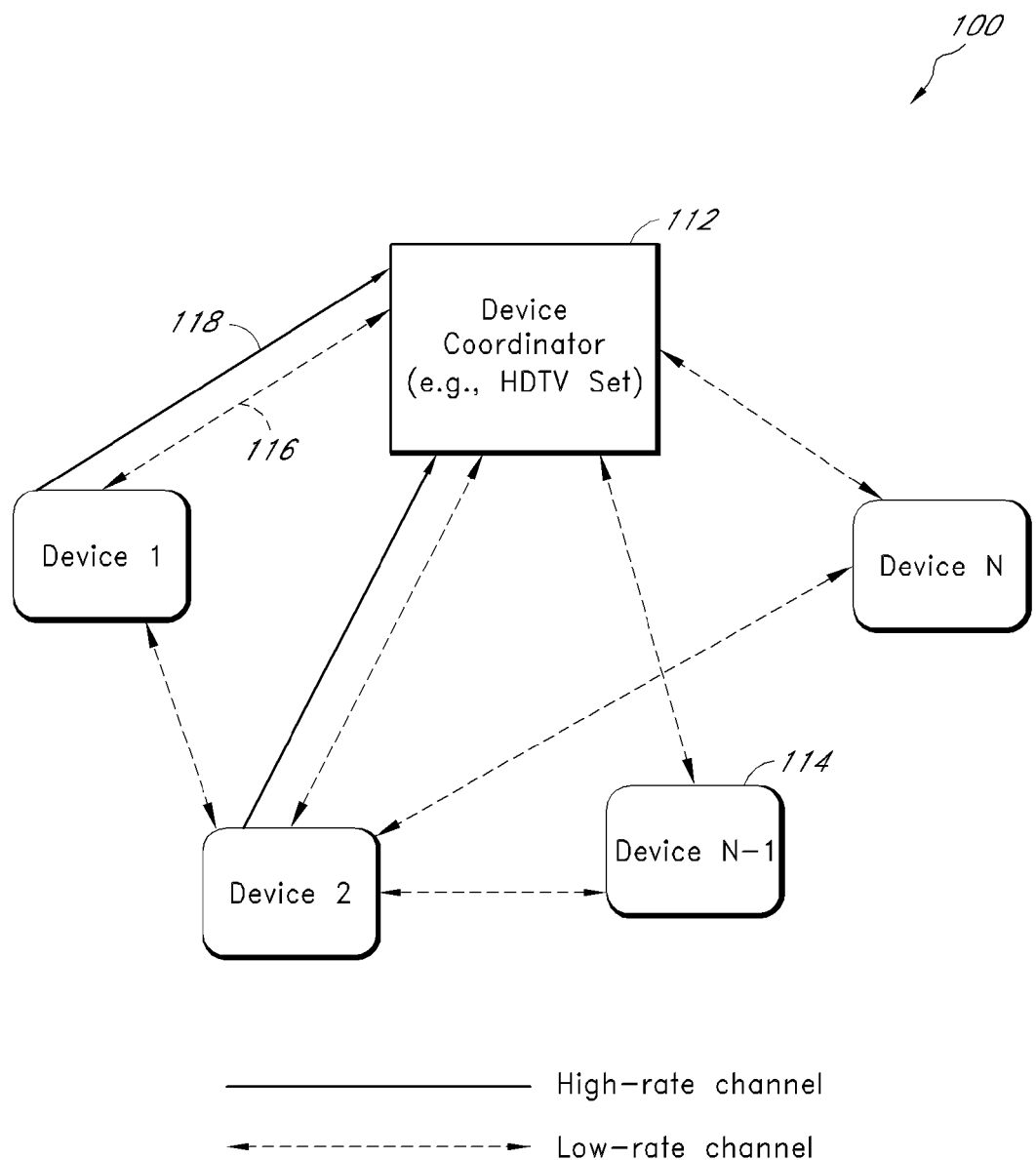
FIG. 1 is a block diagram of an exemplary configuration of a wireless network that implements HD video transmission between wireless devices, according to one embodiment of the system and method.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Overview of Communication System

Certain embodiments provide a method and system for transmission of uncompressed HD video information from a sender to a receiver over wireless channels.

In certain embodiments, a wireless video area network (WVAN) consists of one Coordinator and one or more stations as shown in FIG. 1. The Coordinator is normally, but not always, a device that is a sink for audio or video data, e.g., a display, but also potentially can be a media storage device like a personal video recorder (PVR). A station, on the other hand, is a device that has media that it can either source or sink, potentially not at the same time with the time division duplex (TDD) scheme.

The computing and networking industry uses the Open Systems Interconnection Reference Model (OSI model) for communications and computer network protocol design. The OSI model is a hierarchical structure of seven layers that defines the requirements for communications between multiple devices. The seven layers include an application layer, a presentation layer, a session layer, a transport layer, a network layer, a data link layer, and a physical layer.

Of particular relevance here are the data link and physical layers. The data link layer provides the functional and procedural ways to transfer data between network entities and to detect and possibly correct errors that may occur in the physical layer. The data link layer is divided into two sublayers: a Media Access Control (MAC) layer and a Logical Link Control (LLC) layer. The MAC layer controls how a computer on the network gains access to the data and permission to transmit it. The LLC layer controls frame synchronization, flow control and error checking. The physical (PHY) layer defines the electrical and physical specifications for devices.

In certain embodiments, a high-rate PHY layer (HRP) is a PHY layer that supports multi-Gb/s throughput at a short distance through adaptive antenna technology. Because of this, in certain embodiments, the HRP is highly directional and can only be used for unicast connections as shown in FIG. 1. The HRP is optimized for the delivery of uncompressed high-definition video, but other data can be communicated using the HRP. To support multiple video resolutions, the HRP has more than one data rate defined. The HRP carries isochronous data such as audio and video, asynchronous data, MAC commands, antenna steering information, and higher layer control data for A/V devices.

In certain embodiments, a low-rate PHY layer (LRP) is a multi-Mb/s bidirectional link that also provides a short range. Multiple data rates are defined for the LRP, with the lower data rates having near omni-directional coverage while the highest data rates are directional as shown in FIG. 1. Because the LRP has near omni-directional modes, it can be used for both unicast and broadcast connections. Furthermore, because all stations support the LRP, it can be used for station-to-station links. The LRP supports multiple data rates, including directional modes, and is used to carry low-rate isochronous data such as audio, low-rate asynchronous data, MAC commands including the beacon frame, acknowledgements for HRP packets, antenna steering information, capabilities information, and higher layer control data for A/V devices.

The HRP and LRP operate in overlapping frequency bands and so they are coordinated in a TDMA (time division multiple access) manner by the MAC. The WVAN supports at least one uncompressed 1080p video stream with associated audio at a time. Multiple lower rate uncompressed video streams, e.g., two 1080i video streams, are also supported.

In certain embodiments, the WVAN supports two types of devices: a coordinator and a station. The coordinator controls the timing in the WVAN, keeps track of the members of the WVAN, transmits or receives data using the LRP or using the HRP. The station transmits and receives data using the LRP, initiates stream connections, and transmits or receives data using the HRP. The station may be capable of acting as a coordinator in the WVAN. Such a station is referred to as being coordinator capable.

All compliant devices are able to transmit and receive using the LRP. Both the HRP and LRP may provide multiple data rates.

Detailed Operation of the Communication Systems

Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
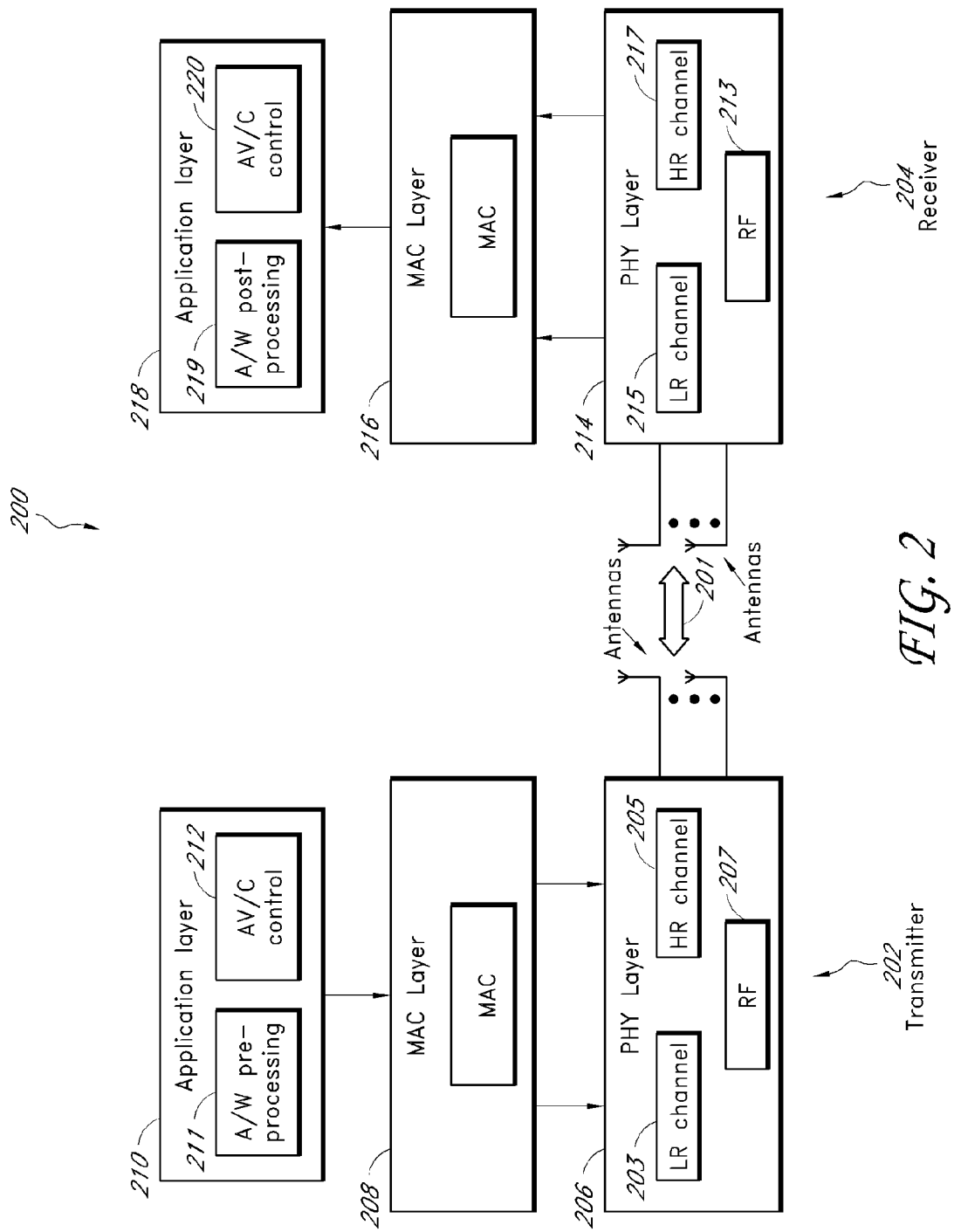
FIG. 2 is a block diagram of an example communication system for transmission of HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Partial Compression Scheme for Wireless Video Data Transmission

Transmission of uncompressed video is challenging because uncompressed video requires transmission of a larger amount of data than compressed video. For example, a wireless video transmission system for supporting high definition (HD) video having a 1080p video frame (i.e., a frame having 1920 vertical lines and 1080 horizontal lines or 1920× 1080 pixels on a frame) with each pixel having three color components (8 bits/color), and a frame rate of 60 Hz requires a channel bandwidth of about 3 Gbps to support video data only. In addition, control signals, audio data, and channel access overhead need additional bandwidth.

Furthermore, a system supporting video with deep color (i.e., higher bits per color such as 10, 12, or 16 bits/color) would require transmission of even a larger amount of data over a wireless channel. Such a system would need a significantly larger channel bandwidth (or a higher video data transmission rate). For example, a system for 16 bits/color needs a channel bandwidth of about 6 Gbps. In addition, if the frame rate increases to 120 Hz, the system would require a channel bandwidth of about 12 Gbps.

One approach to accommodate such a higher data rate is to increase the channel bandwidth. However, the increased channel bandwidth may not be supported by other systems or devices which typically comply with an industrial standard. For example, the current 60 GHz technologies cannot support a data rate substantially higher than 3 Gbps. Thus, increasing the channel bandwidth may not be an appropriate solution in certain instances. Hence, there is a need for a wireless video data transmission scheme that can transmit a desired amount of video data without increasing the channel bandwidth while minimizing adverse effects on the video quality.

In one embodiment, a wireless video data transmission system includes a transmitter, a receiver, and a wireless channel. The transmitter is configured to send the receiver video data over the wireless channel. In one embodiment, the video data sent to the receiver may include an uncompressed portion and a compressed portion. The video data may be partially compressed based at least partly on the significance to the quality of video that the video data represents.

In one embodiment, a video frame of video data may include a plurality of displayable elements. Each of the displayable elements may include data indicative of the luminance and/or chrominance of a pixel. In the embodiments described below, each pixel includes a plurality of sub-pixels, each of which represents one of color components (e.g., red, blue, and green). In these embodiments, each displayable element may represent a single sub-pixel. Each displayable element may be represented by a numerical value indicative of the luminance or chrominance of the displayable element. The numerical value can be a binary value which includes multiple bits, i.e., 0's and/or 1's.

Such a binary value includes a most significant bit (MSB) and a least significant bit (LSB). For example, in a binary value of 10000001, the MSB is the leftmost "1" while the LSB is the rightmost "1." The MSB most significantly affects the displayable element when it is in error because it represents the largest magnitude among the bits. Thus, the MSB most significantly contributes to the video quality. On the other hand, the LSB least significantly affects the displayable element when it is in error because it represents the smallest magnitude among the bits. Thus, the LSB least significantly contributes to the video quality. The bits between the MSB and the LSB have an increasing significance as they are closer to the MSB, and a decreasing significance as they are closer to the LSB. In the context of this document, the term "more significant bits (MSBs)" refers to bits that are more important in value than the rest of bits. Similarly, the term "less significant bits (LSBs)" refers to bits that are less important in value than the rest of bits. In the embodiments described below, the MSBs and the LSBs may be exclusive with each other in a given instance. However, the numbers of bits of MSBs and LSBs can vary depending on the situation.

Figure 3A:
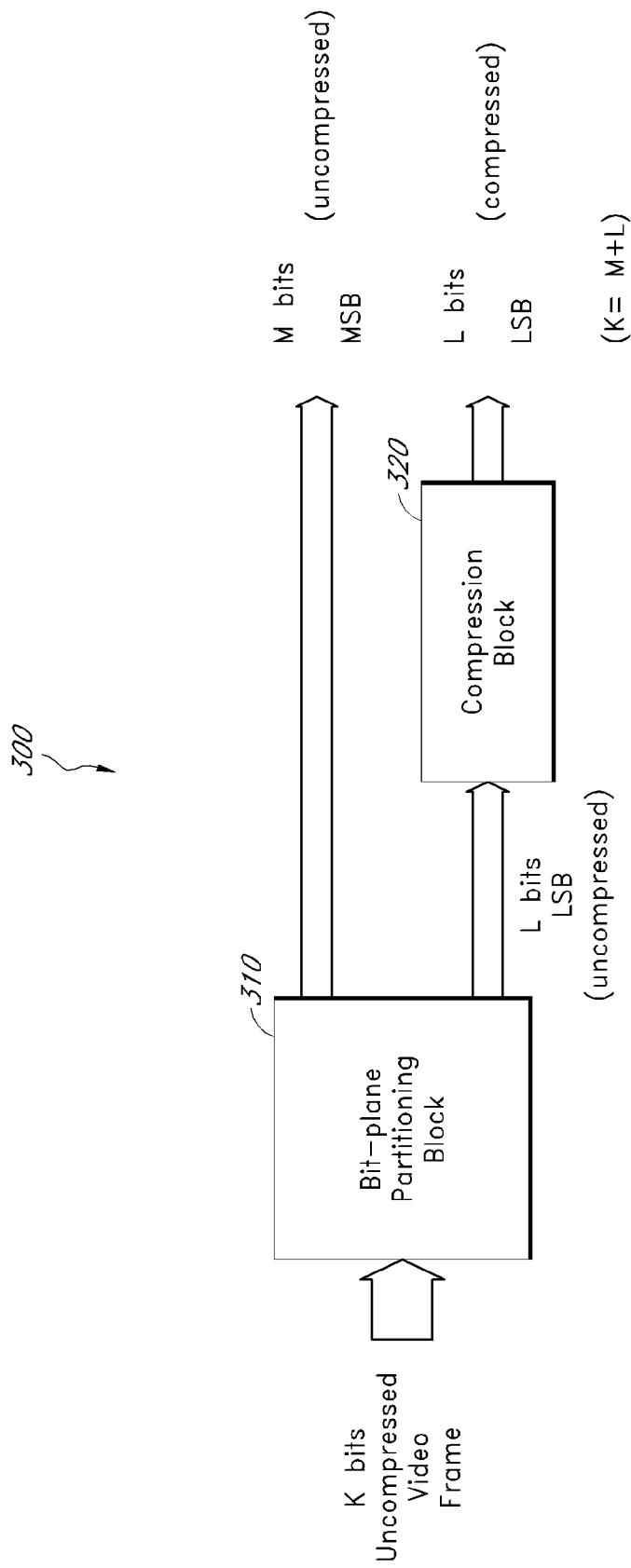
FIG. 3A is a block diagram of an example transmitter, employing partial data compression for transmission of HD video over a wireless medium, according to one embodiment of the system and method.

Referring to FIG. 3A, one embodiment of a wireless transmitter employing a partial video data compression scheme will be now described. The illustrated portion of the transmitter 300 includes a bit-plane partitioning block 310 and a compression block 320. In the context of this document, the term "block" may refer to part of a software program that performs a distinct function or a separable hardware component or segment that performs a distinct function. In certain instances, some of the blocks described above can be combined together to perform multiple functions. In other instances, one or more of the blocks can be divided into a plurality of sub-blocks, each performing distinct functions.

In one embodiment, the bit-plane partitioning block 310 and the compression block 320 can be part of the application layer of the transmitter 300. In another embodiment, the bit-plane partitioning block 310 and the compression block 320 can be part of the MAC layer of the transmitter 300. In yet another embodiment, the bit-plane partitioning block 310 can be part of the application layer of the transmitter 300, and the compression block 320 can be part of the MAC layer of the transmitter 300. In certain embodiments, at least one of the bit-plane partitioning block 310 and the compression block 320 can be part of the PHY layer of the transmitter 300.

Figure 4A:
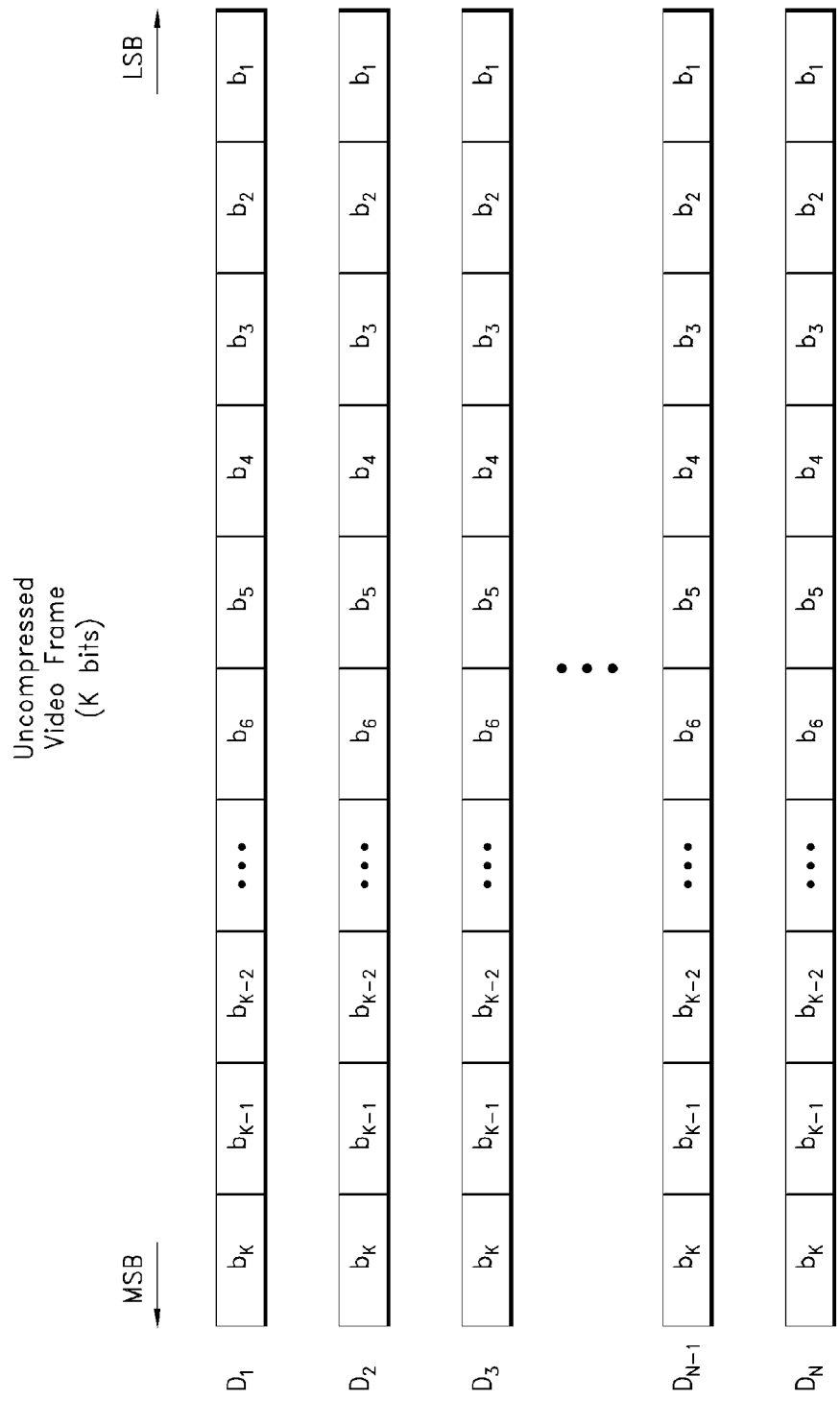
FIG. 4A illustrates displayable elements represented by multiple bits before being bit-plane partitioned for partial data compression according to one embodiment of the system and method.

The bit-plane partitioning block 310 receives an uncompressed video frame. The uncompressed video frame can include x number of vertical lines and y number of horizontal lines, and a total of x×y video pixels. The video pixels can be encoded in either RGB format or YCBCR formats such as 4:4:4. Therefore, each uncompressed video frame may have x×y×3 displayable elements. In one embodiment employing 1080p video format, each video frame has 1920 vertical lines and 1080 horizontal lines, and each pixel has three color components. Thus, each frame has 6,220,800 displayable elements. In the illustrated embodiment, the uncompressed video frame may include a plurality of displayable elements $D_1$-$D_N$, as shown in FIG. 4A. Each of the displayable elements $D_1$-$D_N$ includes K number of bits $b_1$-$b_K$. K is an integer equal to or greater than 1. In the illustrated embodiment, $b_1$ is the LSB and $b_K$ is the MSB.

Figure 4B:
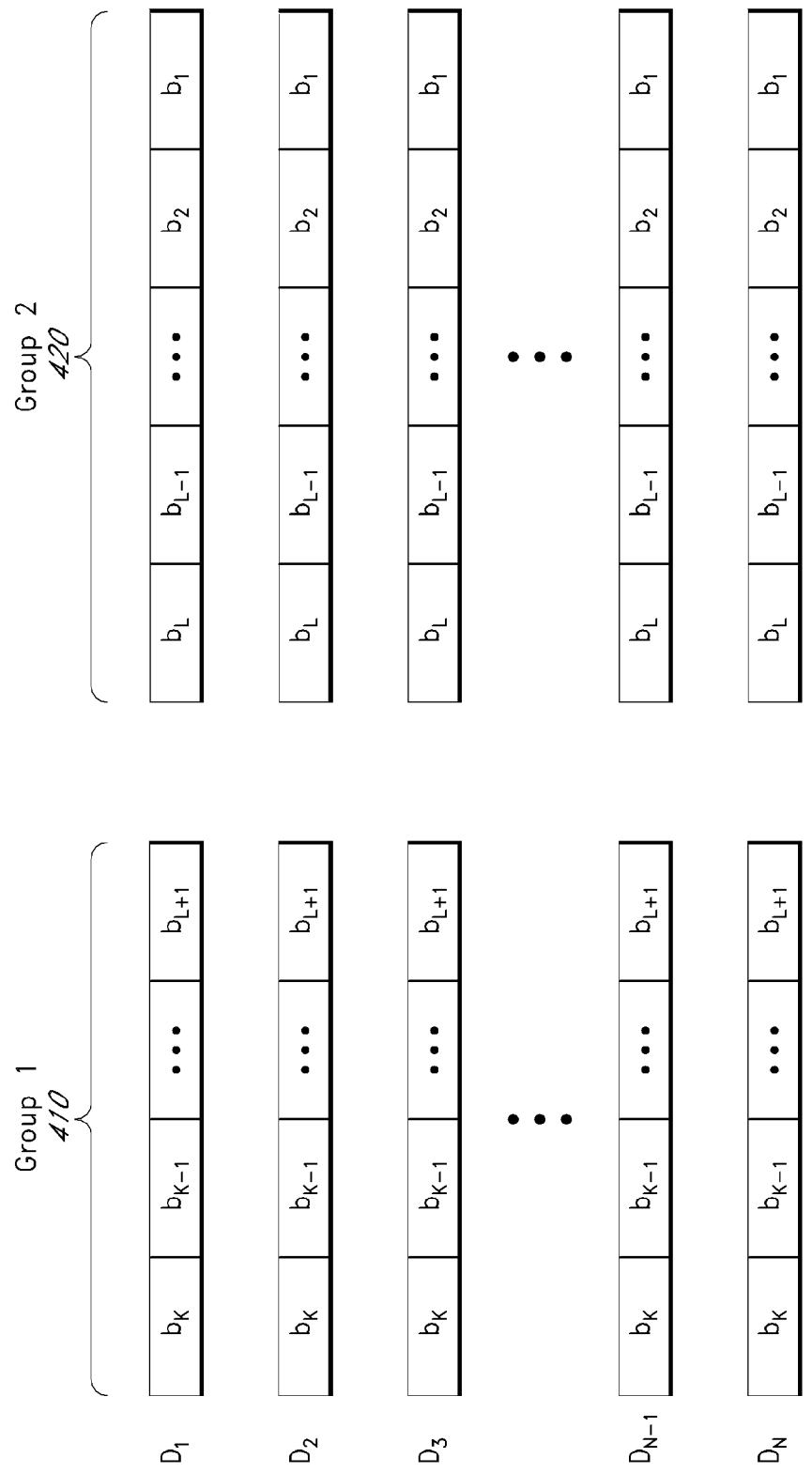
FIG. 4B illustrates displayable elements represented by multiple bits after being bit-plane partitioned for partial data compression according to one embodiment of the system and method.

The bit-plane partitioning block 310 then divides the uncompressed video frame into a plurality of groups. The illustrated bit-plane partitioning block 310 divides the uncompressed video frame into two groups: a first group 410 of MSBs and a second group 420 of LSBs, as shown in FIG. 4B.

The first group 410 of MSBs includes M number of more significant bits from each of the displayable elements $D_1$-$D_N$, i.e., $b_{L+1}$ to $b_K$ (M≦K). M is an integer equal to or greater than 0. The second group 420 of LSBs includes L number of less significant bits from each of the displayable elements $D_1$-$D_N$: $b_1$ to $b_L$ (L=K−M; L≦K). L is an integer equal to or greater than 0. In other words, M number of MSBs of the displayable elements $D_1$-$D_N$ are grouped together to form the first group 410, and L number of LSBs of the displayable elements $D_1$-$D_N$ are grouped together to form the second group 420. In other embodiments, the first group may include M number of data bits, but not limited to MSBs, and the second group may include L number of data bits, but not limited to LSBs, as long as the first group is more significant to the video quality than the second group. For example, the first group may include the most significant bit and some data bits between the most significant bit and the least significant bit. The second group may include the least significant bit and the remaining data bits between the most significant bit and the least significant bit.

Referring back to FIG. 3A, the compression block 320 compresses the second group of LSBs with any suitable compression scheme. In one embodiment, the compression block 320 provides the second group 420 with lossless compression such as JPEG2000, or gzip. In an embodiment where the compression block 320 provides the second group 420 with gzip compression technique, the compression block 320 encodes the second group 420 first with run length coding (RLC) and then with Huffman coding. In another embodiment, the compression block 320 provides the second group 420 with lossy compression. In yet another embodiment, the compression block 320 can alternate the lossless compression and lossy compression, depending at least partly on the wireless channel condition. A skilled artisan will appreciate that various other compression techniques can be adapted for compressing the second group 420.

In one embodiment, the number M of bits of the first group 410 and the number L of bits of the second group 420 may be fixed based on the channel bandwidth, the video data size, and/or compression technique. For example, in a case where a channel bandwidth of 3 Gbps needs to support a video frame having 12 bits per displayable element (color component) and 1080p format, and a frame frequency of 60 Hz, the numbers M and L can be 4 and 8, respectively, where the compression technique can achieve a compression ratio (a ratio of uncompressed data size to compressed data size) of 2:1. A skilled technologist will appreciate that the numbers M and L can vary widely depending on the channel bandwidth, video format, frame frequency, and/or compression ratio.

In another embodiment, the number M of bits of the first group 410 and the number L of bits of the second group 420 can be adjusted based at least partly on the wireless channel condition. For example, if the channel is in a good condition, the number L can be reduced while the number M can be increased. On the other hand, if the wireless channel is in a poor condition, the number L can be increased while the number M can be reduced. Details of such an embodiment will be described below in connection with FIG. 9.

The first group 410 of uncompressed MSBs is transferred without being compressed to a subsequent block. The second group 420 of compressed LSBs is transferred to the subsequent block. The first and second groups 410, 420 are further processed at the subsequent block for wireless transmission. Then, the first uncompressed group 410 is transmitted over the wireless channel and the second compressed group 420 is transmitted over the wireless channel.

Figure 3B:
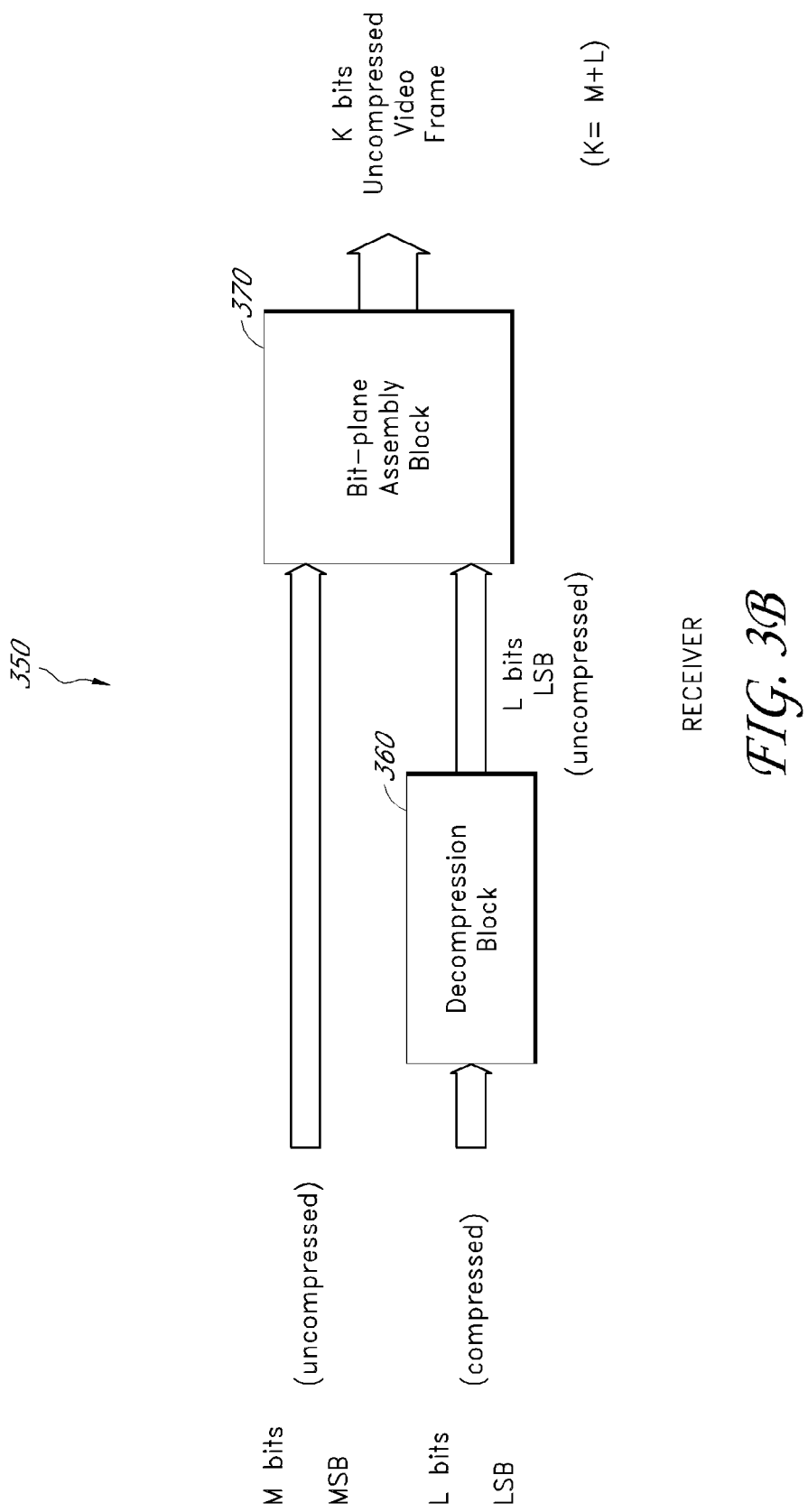
FIG. 3B is a block diagram of an example receiver, employing partial data compression for transmission of HD video over a wireless medium, according to one embodiment of the system and method.

Referring to FIG. 3B, a receiver 350 that receives video data from the transmitter 310 over the wireless channel may include a decompression block 360 and a bit-plane assembly block 370. The decompression block 360 receives the second group 420 of compressed LSBs and decompresses it. The bit-plane assembly block 370 recombines the first group 410 of uncompressed MSBs with the second group 420 of decompressed LSBs, thereby providing an uncompressed video frame that is substantially the same as the original uncompressed video frame. The bit-plane assembly block 370 may provide the recombined uncompressed video frame to other components of the receiver for further processing. A skilled technologist will readily appreciate that the receiver performs any suitable processes to recover the original video frame.

The decompression block 360 and the bit-plane assembly block 370 can be part of the application layer of the receiver 350. In another embodiment, the decompression block 360 and the bit-plane assembly block 370 can be part of the MAC layer of the receiver 350. In yet another embodiment, the bit-plane assembly block 370 can be part of the application layer of the receiver 350, and the decompression block 360 can be part of the MAC layer of the receiver 350. In certain embodiments, at least one of decompression block 360 and the bit-plane assembly block 370 can be part of the PHY layer of the receiver 350.

Figure 5:
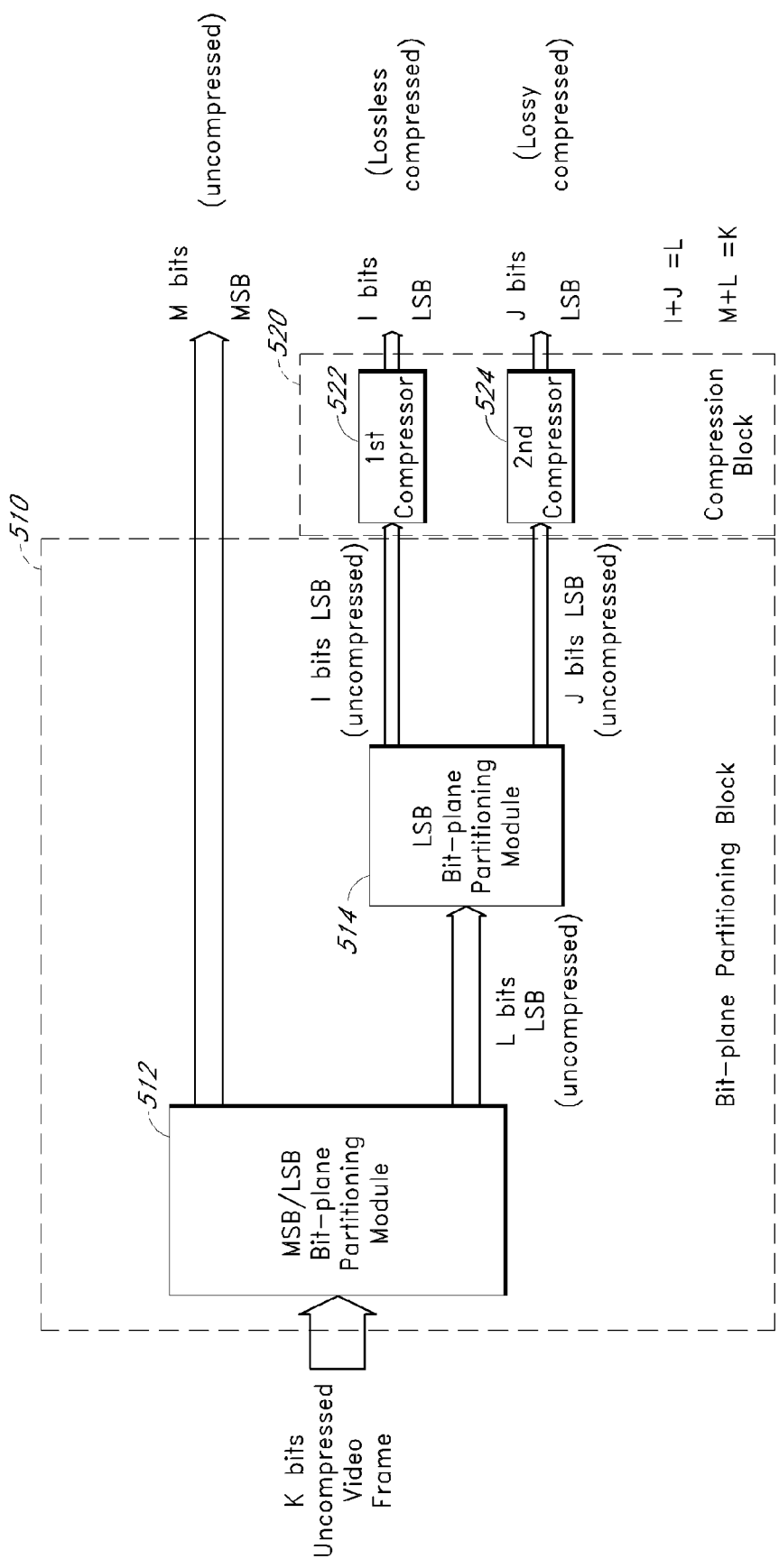
FIG. 5 is a block diagram of an example transmitter, employing partial data compression for transmission of HD video over a wireless medium, according to another embodiment of the system and method.

Referring to FIG. 5, another embodiment of a wireless transmitter employing a partial video data compression scheme will be now described. The illustrated portion of the transmitter 500 includes a bit-plane partitioning block 510 and a compression block 520. The bit-plane partitioning block 510 may include a first bit-plane partitioning module 512 and a second bit-plane partitioning module 514. The compression block 520 may include a first compression module 522 and a second compression module 524. In the context of this document, the term "module" may refer to part of a software program that performs a distinct function or a separable hardware component or segment that performs a distinct function. In certain instances, some of the modules described above can be combined together to perform multiple functions. In other instances, one or more of the modules can be divided into a plurality of sub-blocks, each performing distinct functions.

In one embodiment, the bit-plane partitioning block 510 and the compression block 520 can be part of the application layer of the transmitter 500. In another embodiment, the bit-plane partitioning block 510 and the compression block 520 can be part of the MAC layer of the transmitter 500. In yet another embodiment, the bit-plane partitioning block 510 can be part of the application layer of the transmitter 500, and the compression block 520 can be part of the MAC layer of the transmitter 500.

The first bit-plane partitioning module 512 serves to partition an uncompressed video frame into a plurality of groups. In the illustrated embodiment, the bit-plane partitioning module 512 divides the uncompressed video frame into two groups: a first group of MSBs and a second group of LSBs.

The uncompressed video frame can include data for a plurality of displayable elements $D_1$-$D_N$, as shown in FIG. 4A. Each displayable element is represented by K number of bits. K is an integer equal to or greater than 1. The first group of MSBs may include M number of more significant bits from each of the displayable elements $D_1$-$D_N$: $b_{L+1}$ to $b_K$ (M<K). M is an integer equal to or greater than 0. The second group of LSBs may include L number of less significant bits (L=K−M) from each of the displayable elements $D_1$-$D_N$: $b_1$ to $b_L$. L is an integer equal to or greater than 0. In other words, M number of MSBs of the displayable elements $D_1$-$D_N$ are grouped together to form the first group, and L number of LSBs of the displayable elements $D_1$-$D_N$ are grouped together to form the second group.

Figure 6:
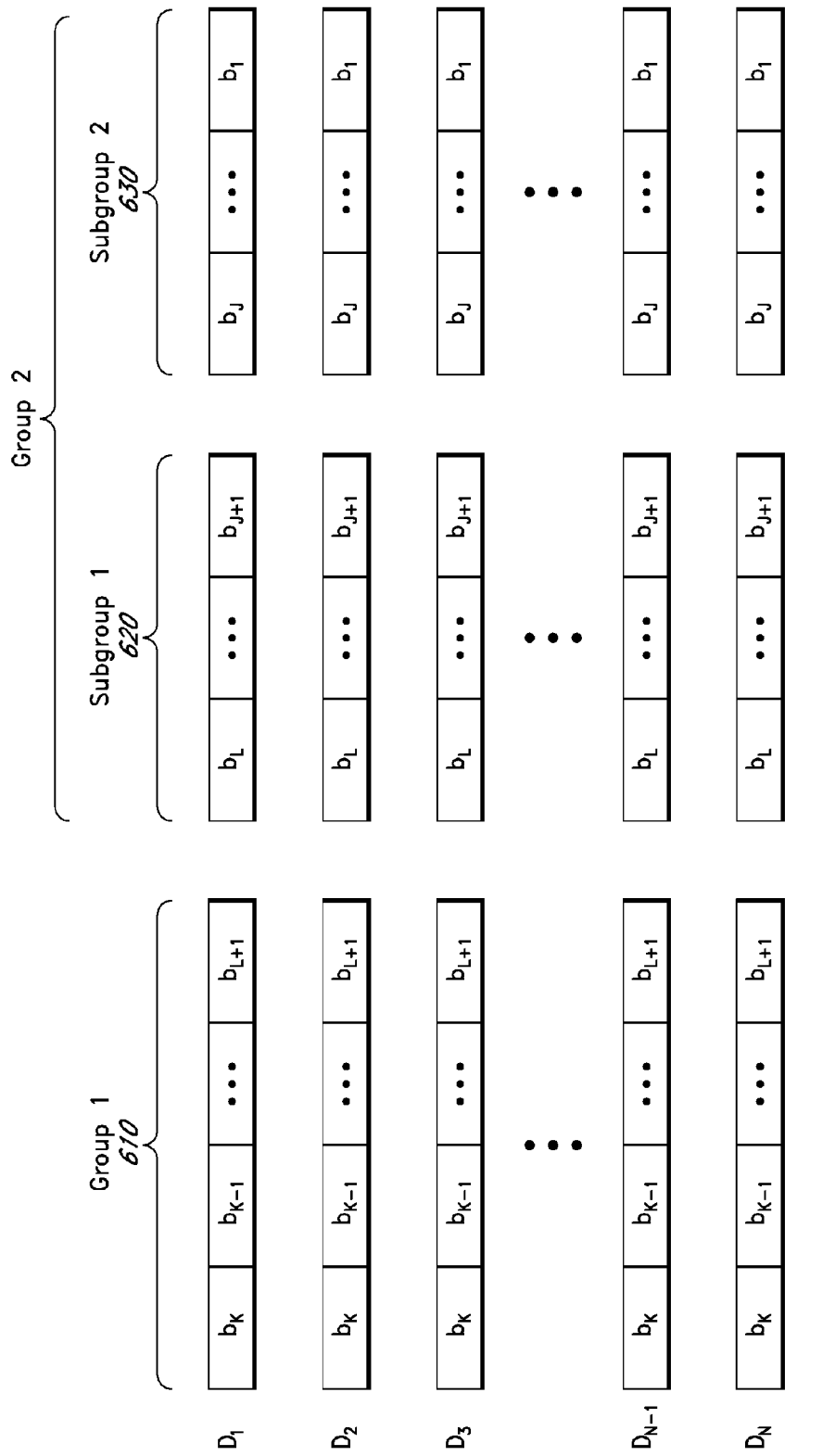
FIG. 6 illustrates displayable elements represented by multiple bits after being bit-plane partitioned for partial data compression according to another embodiment of the system and method.

The second bit-plane partitioning module 514 serves to partition the second group of LSBs into a plurality of subgroups. In the illustrated embodiment, the second bit-plane partitioning module 514 divides the second group of LSBs into two subgroups: a first subgroup 620 of LSBs and a second subgroup 630 of LSBs, as shown in FIG. 6. The first subgroup 620 of LSBs includes I number of less significant bits from each of the displayable elements $D_1$-$D_N$: $b_{J+1}$ to $b_L$ (I≦L), as shown in FIG. 6. I is an integer equal to or greater than 0. The second subgroup 630 of LSBs includes J number (J=L−I) of less significant bits of the displayable elements $D_1$-$D_N$: $b_1$ to $b_J$ as shown in FIG. 6. J is an integer equal to or greater than 0. In other words, I number of LSBs of the displayable elements $D_1$-$D_N$ are grouped together to form the first subgroup 620, and J number of LSBs of the displayable elements $D_1$-$D_N$ are grouped together to form the second subgroup 630. The second subgroup 630 is less significant to the video quality than the first subgroup 620.

Resulting groups from the bit-plane partitioning block 510 are shown in FIG. 6. The video frame has been divided into three groups: a first group 610 of M number of MSBs, a first subgroup 620 of I number of LSBs, and a second subgroup 630 of J number of LSBs with a decreasing significance to the video quality.

In one embodiment, the numbers M, I, and J may be fixed, based on the channel bandwidth, the video data size, and/or compression techniques. For example, in a case where a channel bandwidth of 3 Gbps needs to support a video frame having 12 bits per displayable element (color component) and 1080p format, and a frame frequency of 60 Hz, the numbers M, I, and J can be 2, 6, and 4, respectively, where the compression block 520 can provide a lossless compression ratio of 1.5:1 and a lossy compression ratio of 2:1. A skilled technologist will appreciate that the numbers M and L can vary widely depending on the channel bandwidth, video format, frame frequency, and/or compression ratio.

In another embodiment, the numbers M, I, and J can be adjusted based at least partly on the channel condition. For example, if the channel is in a good condition, I and/or J can be reduced while M can be increased. On the other hand, if the channel is in a poor condition, I and/or J can be increased while M can be reduced. Details of such an embodiment will be described below in connection with FIG. 9.

In another embodiment, a single bit-plane partitioning module can replace the first and second bit-plane partitioning modules 512, 514 of FIG. 5. The single bit-plane partitioning module can divide an uncompressed video frame into three groups of bits as the combination of the first and second bit-plane partitioning modules 512, 514 does. The single bit-plane partitioning module can provide the first group and the first and second subgroups of data bits, as shown in FIG. 6.

The first compression module 522 may compress the first subgroup 620 of LSBs (FIG. 6) with a first compression scheme. In one embodiment, the first compression scheme may be a lossless compression scheme. The first compression module 522 may provide the first subgroup 620 first with run length coding (RLC) and then with Huffman coding.

The second compression module 524 may compress the second subgroup 630 of LSBs (FIG. 6) with a second compression scheme. The second compression scheme may provide data with higher compression ratio than the first compression scheme while providing less accurate data than the first scheme. In one embodiment, the second compression scheme may be a lossy compression scheme. A skilled technologist will appreciate that various lossy compression schemes can be adapted for compressing the second subgroup 630 of LSBs.

The first group of uncompressed MSBs is transferred to a subsequent block. The first subgroup of lossless-compressed LSBs is transferred to the subsequent block. The second subgroup of lossy-compressed LSBs is transferred to the subsequent block. The first group and the first and second subgroups are further processed at the subsequent block for wireless transmission. Subsequently, the first uncompressed group, the first lossless-compressed subgroup, and the second lossy-compressed subgroup are transmitted over the wireless channel.

In another embodiment, the bit-plane partitioning block can divide a uncompressed video frame into four or more groups or subgroups of bits based on the significance of the bits, depending on the needs of the system. A group of MSBs is uncompressed while the other groups of less significant bits are compressed with different compression schemes. The less significant the group of bits is, the more compression the group of bits is provided with such that the video quality is less sacrificed with a given channel capacity and condition.

Figure 7A:
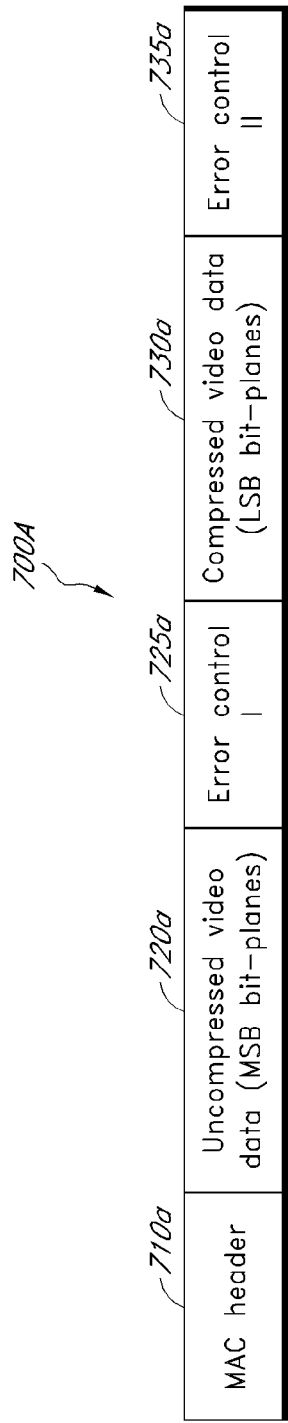
FIG. 7A is one embodiment of a MAC frame format used with partial data compression for transmission of HD video over a wireless medium.

Referring to FIG. 7A, one embodiment of a MAC frame format that can be used in conjunction with the partial data compression scheme will be now described. The illustrated MAC frame may be generated using video data processed by the transmitter of FIG. 3A. In one embodiment, at the MAC layer of the transmitter, a first group of uncompressed MSBs is provided with a first error control scheme, and a second group of compressed LSBs is provided with a second error control scheme. The first error control scheme may provide stronger error protection than the second error control scheme. Subsequently, separate checksums are provided to the first and second groups. A MAC frame 700A containing video data processed in this manner is shown in FIG. 7A.

In one embodiment, the error control scheme may be of a forward error correction (FEC) type (e.g., Reed-Solomon (RS) code). In such an embodiment, an error code is generated by the FEC module of the transmitter. In other embodiments, the error control scheme can be provided by unequal error protection (UEP) constellation mapping. In such embodiments, different degrees of error protection may be provided while no error correction codes are generated.

The illustrated MAC frame 700A may be used with an FEC type error control scheme. The MAC frame 700A includes a MAC header 710a, a first video data field 720a, a first error control field 725a, a second video data field 730a, and a second error control field 735a. The fields 720a, 725a, 730a, 735a may collectively form a payload field.

The MAC header 710a may include information indicative of source and destination. The MAC header 710a may also include information on partial compression, i.e., which bits are compressed. In one embodiment, the information may indicate the number of uncompressed MSBs per displayable element. In such an embodiment, the receiver may determine the number of compressed LSBs, based on the total number of bits per displayable element. In another embodiment, the information may indicate the number of compressed LSBs per displayable element. In such an embodiment, the receiver may determine the number of uncompressed MSBs, based on the total number of bits per displayable element. In yet another embodiment, the MAC header 710 may include a bitmap indicative of whether individual bits of a displayable element are compressed or uncompressed. For example, the bitmap may include "1" for a compressed bit and "0" for an uncompressed bit.

In other embodiments, a MAC frame may include a separate field to include the information on partial data compression. In certain embodiments, the transmitter may send a separate signal including the information to the receiver.

The first video data field 720a includes the first group of uncompressed MSBs protected with the first error control scheme. The first error control field 725a may include a first error correction code. The second video data field 730a includes the second group of compressed LSBs protected with the second error control scheme. The second error control field 735a may include a second error correction code.

Figure 7B:
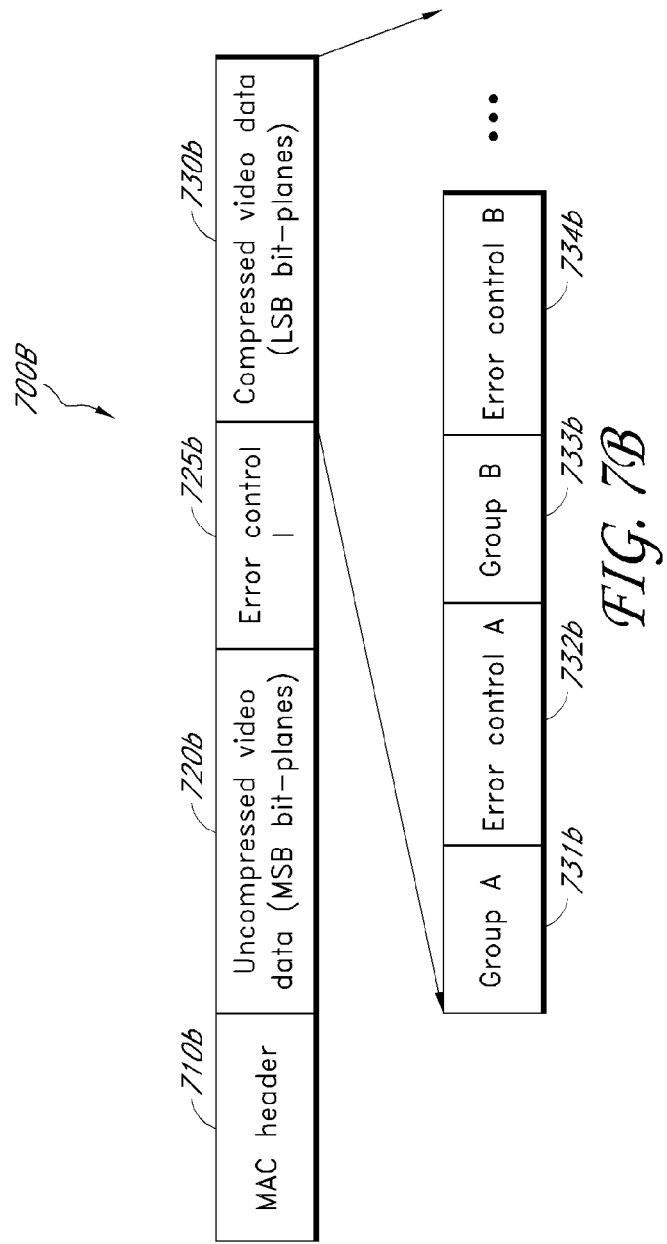
FIG. 7B is another embodiment of a MAC frame format used with partial data compression for transmission of HD video over a wireless medium.

Referring to FIG. 7B, another embodiment of a MAC frame format that can be used in conjunction with the partial data compression scheme will be now described. In one embodiment, the frame format may be generated using video data that has been processed by the transmitter of FIG. 3A. In such an embodiment, a group of compressed LSBs is further divided into a plurality of subgroups of LSBs, based at least partly on their significance on the video quality. In other embodiments, the video data frame may be generated using video data that has been processed by the transmitter of FIG. 5. The groups of compressed LSBs (e.g., the first subgroup of lossless compressed LSBs and the second subgroup of lossy compressed LSBs) may be included in the frame format without being further divided into a plurality of subgroups. In other instances, one or both of the subgroups of compressed LSBs may be further divided into a plurality of groups of LSBs, based at least partly on their significance to the video quality.

In the illustrated embodiment, at the MAC layer of the transmitter, a first group of uncompressed MSBs is provided with a first error control scheme, and a second group of compressed LSBs is further divided into a plurality of subgroups, based on the significance on the video quality. For example, the second group can be divided into the first and second subgroups 620, 630 of LSBs, as shown in FIG. 6. The subgroups 620, 630 may be provided with different degrees of error control schemes, depending on their significance to the video quality. In one embodiment, the first subgroup 620 is more significant to the quality of video than the second subgroup 630, and thus the first subgroup 620 may be provided with an error control scheme stronger than an error control scheme for the second subgroup 630.

In one embodiment, the first error control scheme may be a stronger error control scheme than each of the error control schemes for the subgroups. The error control schemes may be one of a forward error correction (FEC) scheme or a modulation and coding scheme (MCS). In one embodiment, each of the groups may be encoded with a Reed-Solomon (RS) code. In other embodiments, the error control schemes may be provided by unequal error protection (UEP) constellation mapping. Subsequently, separate checksums are provided to the first group and each of the subgroups. A MAC frame 700A containing video data processed in this manner is shown in FIG. 7B.

The illustrated MAC frame 700B may be used with an FEC type error control scheme. The MAC frame 700B includes a MAC header 710b, a first video data field 720b, a first error control field 725b, and a second video data field 730a. The details of the MAC header 710b can be as described above with respect to the MAC header 710a of FIG. 7A. The first video data field 720b includes the first group of uncompressed MSBs protected with the first error control scheme. The first error control field 725b includes a first error correction code. The second video data field 730b includes the plurality of subgroups of compressed LSBs, each protected with different levels of error control schemes. In the illustrated embodiment, the second video data field 730*b* includes a plurality of video data sub-fields 731*b*, 733*b*, each followed by an error control field 732*b*, 734*b*, each of which includes an error correction code.

In certain embodiments, the group of uncompressed MSBs and the group(s) of compressed LSBs may be provided with the same level of error protection. In other embodiments, MAC frames may not include error control fields, but can still have the group of uncompressed MSBs and the group(s) of compressed LSBs provided with unequal error protection (UEP) by, for example, using different constellation mapping schemes. A skilled artisan will appreciate that the MSBs and the LSBs can be provided with any suitable error correction schemes.

Referring to FIGS. 8A-8C, one embodiment of a system for further processing video data in conjunction with the partial data compression scheme described above will be now described below. FIG. 8A illustrates a portion of the PHY (physical) layer 800 of a transmitter employing one of the partial data compression schemes described above in connection with FIG. 3A or 5. The PHY layer 800 can include a bit mixer 810 and a PHY unequal error protection (UEP) block 820.

The bit mixer 810 may receive uncompressed MSBs (M bits) and compressed LSBs (L bits), e.g., the uncompressed MSBs (M bits) and compressed LSBs (L bits) of FIGS. 3A and 4B, from the MAC layer of the transmitter. The bit mixer 810 may combine the uncompressed MSBs of a displayable element (e.g., a sub-pixel representing a color component) with the compressed LSBs of the displayable element, as shown in FIG. 8B, thereby providing a modified displayable element.

The PHY UEP module 820 receives the modified displayable element. The PHY UEP module 820 provides the uncompressed MSBs with a stronger error protection than the compressed LSBs, as shown in FIG. 8C. The resulting displayable element may be further processed for transmission over a wireless channel.

Figure 9:
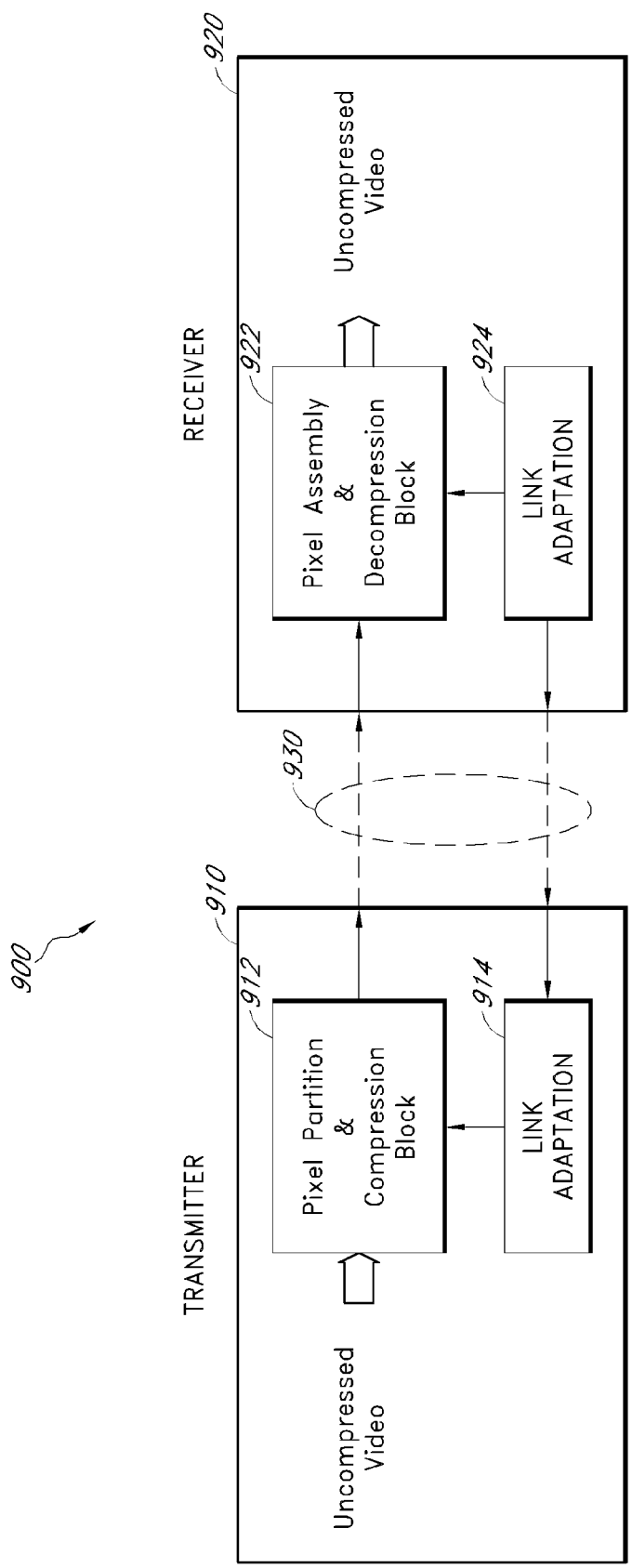
FIG. 9 is a block diagram of an example communication system employing partial data compression for transmission of HD video over a wireless medium, according to one embodiment of the system and method.

Referring to FIG. 9, a system employing a partial data compression scheme according to another embodiment will be now described below. In the illustrated embodiment, the system 900 includes a transmitter 910, a receiver 920, and a wireless channel 930.

The transmitter 910 can include a bit-plane partition and compression block 912 and a transmitter link adaptation block 914. The details of the bit-plane partition and compression block 912 can be as described above with reference to FIG. 3A or 5. The bit-plane partition and compression block 912 may be part of any one of the application layer, the MAC layer, or the PHY layer of the transmitter 910. In one embodiment, the bit-plane partition and compression block 912 receives uncompressed video data, and processes it to provide a first group of uncompressed MSBs and a second group of compressed LSBs. The first group includes a variable number M of MSBs. The second group includes a variable number L of LSBs. Each of M and L may be an integer equal to or greater than 0. In the illustrated embodiment, a total of M and L is equal to K which is a constant integer equal to or greater than 1.

The transmitter link adaptation block 914 receives information on video data transmission between the transmitter 910 and the receiver 920 from the receiver 920 over the wireless channel 930. The information can include, but is not limited to, the conditions of the channel 930, and the quality of video data received at the receiver 920. Such channel conditions may include one or more of signal-to-interference and/or signal-to-noise ratio (SNIR), packet error rate, or bit-error-rate, etc. In one embodiment, the application layer 218 (FIG. 2) at the receiver 204 provides feedback such as a measure of picture quality, e.g., peak signal-to-noise ratio (PSNR). The transmitter link adaption block 914 provides the information to the bit-plane partition and compression block 912.

The receiver 920 can include a bit-plane assembly and decompression block 922 and a receiver link adaptation module 924. The bit-plane assembly and decompression block 922 may be part of any one of the application layer, the MAC layer, or the PHY layer of the receiver 920. The bit-plane assembly and decompression block 922 receives the first group of uncompressed MSBs and the second group of compressed LSBs. The bit-plane assembly and decompression block 922 then decompressed the LSBs in the second group, and then combines the first group of uncompressed MSBs with the second group of decompressed LSBs. The bit-plane assembly and decompression block 922 may provide the combined video data to another component of the transmitter 920 for further processing to recover the original video data.

The receiver link adaptation block 924 receives the information on video data transmission between the transmitter 910 and the receiver 920 from the bit-plane assembly and decompression block 922. The receiver link adaption block 924 provides the information to the transmitter link adaptation module 914 over the channel 930.

During operation, the receiver 922 receives video packets and processes it at the bit-plane assembly and decompression block 922. The receiver link adaptation module 924 is provided with information on channel conditions such as bit error ratio (BER), signal to noise ration (SNR), packet error ratio (PER), etc. The receiver link adaptation block 924 either sends the information or an encoded signal to the transmitter link adaptation block 914. The transmitter link adaptation block 914 processes the information or the encoded signal from the receiver link adaptation block 924, and provides it to the bit-plane partition and compression block 912.

Based at least partly on the information from the transmitter link adaptation block 914, the bit-plane partition and compression block 912 adjusts the numbers M and L. When the channel 930 is in a good condition, the transmitter 910 can adaptively increase the number of uncompressed bits. On the other hand, when the channel 930 is in a bad condition, the transmitter 910 can decrease the number of uncompressed bits.

In certain embodiments, the transmitter can move between no compression mode and full compression mode, depending on the channel condition. For example, when the wireless channel has the maximum capacity, no portion of the video data may be compressed. On the contrary, when the wireless channel has the minimum capacity due to the channel condition, all of the video data may be compressed.

In the embodiments described above, a frame of video data is partially compressed. In other embodiments, a packet of video data may be partially compressed. A skilled technologist will appreciate that video data may be partially compressed in any suitable manner.

In the embodiments described above, the partial video data compression schemes permit transmission of an amount of video data that would exceed a given wireless channel capacity if the video data is fully uncompressed, while minimizing adverse effects on the quality of the video data. Furthermore, the schemes can also be used for accommodating varying channel conditions while optimizing the video quality. A latency that would be caused by full data compression can also be reduced by the partial compression schemes.

The foregoing description is that of embodiments of the invention and various changes, modifications, combinations and sub-combinations may be made without departing from the spirit and scope of the invention, as defined by the appended claims.

What is claimed is:

1. A method of wireless communication for video data, the method comprising:
receiving a video frame comprising a plurality of color encoded pixels, each pixel including a plurality of data bits representing color components;
dividing the plurality of data bits of each pixel in the video frame into a first group of data bits and a second group of data bits based at least partly on significance to the quality of the video image;
compressing the second group of data bits based at least partly on the significance to the quality of the video image after dividing the plurality of data bits of each pixel in the video frame; and
in a physical layer, transmitting the first group and the second group of data bits over a wireless channel after compressing the second group.

2. The method of claim 1, wherein each pixel includes K number of data bits, wherein dividing the plurality of data bits for each pixel in the video frame comprises dividing the K number of data bits into a first group of M number of data bits and a second group of L number of data bits, the K number being equal to a total of the M and L numbers, each of the M and L numbers being an integer equal to or greater than 1.

3. The method of claim 2, wherein the first group includes the M number of more significant bits (MSBs), wherein the second group includes the L number of less significant bits (LSBs), wherein each of the MSBs are more significant to the quality of the video image than each of the LSBs.

4. The method of claim 2, wherein the color encoded pixels are each assigned a numerical value indicative of luminance or chrominance, wherein the numerical value comprises a binary value which includes a most significant bit (MSB) and a least significant bit (LSB).

5. The method of claim 2, wherein dividing the plurality of data bits further comprises dividing the second group of the L number of data bits into a first subgroup of I number of data bits and a second subgroup of J number of data bits, the L number being equal to a total of the I and J numbers, each of the I and J numbers being an integer equal to or greater than 1, and wherein the first subgroup is more significant to the quality of the video image than the second subgroup.

6. The method of claim 5, wherein compressing the second group comprises:
compressing the first subgroup with a first compression technique; and
compressing the second subgroup with a second compression technique different from the first compression technique.

7. The method of claim 6, wherein the first compression technique comprises a lossless compression technique, and wherein the second compression technique comprises a lossy compression technique.

8. The method of claim 1, further comprising adjusting the numbers of data bits in two or more of the plurality of groups, based at least partly on a condition of the wireless channel.

9. The method of claim 8, further comprising receiving a signal indicative of the condition of the wireless channel, wherein the numbers are adjusted in response to the signal.

10. The method of claim 1, wherein the number of data bits in each of the first group and the second group is pre-selected, based at least partly on the data size of the video image and the bandwidth of the wireless channel.

11. The method of claim 1, further comprising providing the first group and the second group with different levels of error protection after compressing the second group and before transmitting the first group and the second group.

12. The method of claim 11, wherein providing the first group and the second group with different levels of error protection comprises providing the first group with a first level of error protection and the second group with a second level of error protection, the first group being more significant to the quality of the video image than the second group, the second level being lower than the first level.

13. The method of claim 11, wherein providing the first group and the second group with different levels of error protection comprises providing the first group and the second group with an error control scheme comprising at least one of a forward error correction (FEC) scheme, a modulation and coding scheme (MCS), and a constellation mapping mode.

14. The method of claim 1, further comprising:
in a media access controller (MAC) layer, a first group of most significant bits (MSBs) of the color encoded pixels are provided with a first error control scheme, and a second group of compressed least significant bits (LSBs) of the color encoded pixels are divided into a plurality of subgroups based on significance on video quality, wherein the plurality of subgroups are provided with different degrees of error control schemes based on the significance on the video quality.

15. The method of claim 1, wherein the first group of uncompressed MSBs is combined with the second group of compressed LSBs forming modified encoded pixels, and the modified encoded pixels are transmitted over the wireless channel.

16. The method of claim 1, wherein the first group of data bits comprises more significant bits (MSBs) and the second group of data bits comprises less significant bits (LSBs), wherein the first group of data bits has more significance to the quality of the video image than the second group of data bits.

17. The method of claim 1, wherein the color encoding of each pixel is based on a color format including multiple color components.

18. The method of claim 17, wherein the color format comprises of one of a red-green-blue (RGB) format and a luminance, chroma: blue, chroma: red (YCBCR) format.

19. The method of claim 1, wherein compression of the first group of data bits is not performed based at least partly on the significance to the quality of the video image after dividing the plurality of data bits for each pixel in the video frame.

20. A method of wireless communication for video data, the method comprising:
receiving a video frame comprising a plurality of color encoded pixels, each pixel including a plurality of data bits representing color components;
receiving information on a condition of a wireless channel;
selectively compressing the plurality of data bits for each pixel in the video frame, based at least partly on the condition of the wireless channel, wherein the plurality of data bits are selectively compressed based at least partly on significance to the quality of the video image; and in a physical layer, transmitting the selectively compressed data bits over the wireless channel.

21. The method of claim 20, wherein selectively compressing the plurality of data bits comprises compressing none of the data bits when the wireless channel has the maximum capacity.

22. The method of claim 20, wherein selectively compressing the plurality of data bits comprises compressing all of the data bits when the wireless channel has the minimum capacity.

23. The method of claim 20, wherein the condition comprises at least one of signal-to-interference and/or signal-to-noise ratio (SNIR), packet error rate (PER), bit-error-rate (BER), or peak-signal-to-noise-ratio (PSNR).

24. A system for wireless communication of video data, the system comprising:
   a transmitter configured to send a plurality of groups of data bits over a wireless channel, wherein the data bits, in an uncompressed form, together form one or more color encoded pixels representing at least a portion of a video image, wherein the plurality of groups have different degrees of significance to the quality of the video image, and each color encoded pixel includes a plurality of color encoded data bits that are divided into the plurality of groups based on the different degrees of significance to the quality of the video image; and
   wherein the plurality of groups comprise a first group of uncompressed data bits, and a second group of compressed data bits, the first group having a higher degree of significance to the quality of the video image than the second group; and
   a receiver configured to receive the plurality of groups of data bits over the wireless channel.

25. The system of claim 24, wherein the transmitter comprises:
   a first block configured to divide the one or more color encoded pixels, each of which includes the data bits in the uncompressed form, into the plurality of groups of data bits, wherein the data bits are divided into the plurality of groups based at least partly on significance to the quality of the video image; and
   a second block configured to compress at least one, but not all, of the groups of data bits based at least partly on the significance to the quality of the video image after dividing the color encoded pixels.

26. The system of claim 24, wherein the video image comprises a plurality of pixels, each of the pixels comprising a plurality data bits representing color components.

27. The system of claim 24, wherein the transmitter is configured for leaving at least a group including the most significant bit of the data bits uncompressed, and wherein the second block is configured for compressing at least a group including the least significant bit of the data bits.

28. The system of claim 24, wherein the second block is configured for compressing a first group with a first compression technique, and for compressing a second group with a second compression technique different from the first compression technique, wherein the first group has more significance to the quality of the video image than the second group.

29. The system of claim 28, wherein the first compression technique comprises a lossless compression technique, and wherein the second compression technique comprises a lossy compression technique.

30. The system of claim 24, wherein the first block is configured for adjusting the numbers of data bits in two or more of the plurality of groups, based at least partly on a condition of the wireless channel.

31. The system of claim 30, wherein the receiver is further configured for providing the transmitter with a signal indicative of the condition of the wireless channel, wherein the first block is configured for adjusting the numbers in response to the signal.

32. The system of claim 24, wherein the first block is configured for selecting the number of data bits in each of the plurality of groups, based at least partly on the data size of the video image and the capacity of the wireless channel.

33. The system of claim 24, wherein the transmitter is further configured for providing the plurality of groups with different levels of error protection, based at least partly on the significance to the quality of the video image.

34. A wireless communication device for transmitting video data, the device comprising:
   a transmitter comprising:
      a first block configured for receiving a video frame comprising a plurality of color encoded pixels, each pixel including a plurality of data bits representing color components, and for dividing the plurality of data bits of each pixel into a plurality of groups of data bits, wherein the plurality of data bits are divided into the plurality of groups based at least partly on significance to the quality of the video image; and
      a second block configured for compressing at least one, but not all, of the groups of data bits based at least partly on the significance to the quality of the video image.

35. A wireless communication device for receiving video data, the device comprising:
   a receiver configured for receiving and processing a plurality of groups of data bits over a wireless channel, wherein the data bits, in an uncompressed form, together form one or more color encoded pixels representing at least a portion of a video image,
   wherein the plurality of groups have different degrees of significance to the quality of the video image;
   wherein each color encoded pixel includes a plurality of color encoded data bits that are divided into the plurality of groups based on the different degrees of significance to the quality of the video image; and
   wherein the plurality of groups comprise a first group of uncompressed data bits, and a second group of compressed data bits, the first group having a higher degree of significance to the quality of the video image than the second group.

36. The device of claim 35, wherein the receiver comprises:
   a first block configured for decompressing the second group of compressed data bits; and
   a second block configured for combining the first group of uncompressed data bits with the second group of decompressed data bits.

37. A method of wireless communication for video data, the method comprising:
   receiving a video frame comprising a plurality of encoded pixels, each pixel including a plurality of data bits representing color components;
   dividing the plurality of data bits of each pixel in the video frame into a first group of data bits and a second group of data bits, wherein the first group of data bits comprises more significant bits (MSBs) and the second group of data bits comprises less significant bits (LSBs), wherein the first group of data bits has more significance to the quality of the video image than the second group of data bits;

compressing only the second group of data bits based at least partly on the significance to the quality of the video image after dividing the plurality of data bits; and in a physical layer, transmitting the first group and the second group of data bits over a wireless channel after compressing the second group.

* * * * *